United States Patent [19]
Yaeger et al.

[11] 3,791,911
[45] Feb. 12, 1974

[54] ADHESIVE FREE FIBER REINFORCED LAMINATE

[75] Inventors: Luther L. Yaeger; Wei-Gwo Chen, both of Houston, Tex.

[73] Assignee: Griffolyn Company, Incorporated, Houston, Tex.

[22] Filed: Feb. 23, 1972

[21] Appl. No.: 228,783

Related U.S. Application Data

[63] Continuation of Ser. No. 871,916, Oct. 28, 1969, abandoned.

[52] U.S. Cl............... 161/58, 156/77, 156/179, 161/59, 161/143, 161/151, 161/161, 161/402
[51] Int. Cl............................................. B32b 5/12
[58] Field of Search.... 156/179, 77; 161/57, 58, 59, 161/140, 142–144, 151, 161, 402

[56] References Cited
UNITED STATES PATENTS

| | | | |
|---|---|---|---|
| 2,719,100 | 9/1955 | Banigan | 161/402 X |
| 3,471,353 | 10/1969 | Rasmussen | 161/402 X |
| 2,861,022 | 11/1958 | Lundsager | 161/402 X |

*Primary Examiner*—William A. Powell
*Attorney, Agent, or Firm*—W. F. Hyer

[57] ABSTRACT

By very rapid and precise electronic controlled heat application, with conditions held between specified critical limits, Applicants have succeeded in producing reinforced laminates without the use of adhesives, and yet retaining the capacity of the reinforcements to move controllably in response to stresses so as to present maximal tear resistance.

11 Claims, 7 Drawing Figures

PATENTED FEB 12 1974 3,791,911

ADHESIVE FREE FIBER REINFORCED LAMINATE

This application is a continuation of Ser. No. 871,916, filed Oct. 28, 1969 (now abandoned).

PRIOR ART

This invention relates to reinforced plastic laminates and has for its object an inexpensive method for producing such laminates at high speed.

Heretofore laminates have been made by applying adhesive to plastic film, feeding in the reinforcing fiber between said films and then laminating them together, or by heat sealing films together with fibers or scrim between them, by means of heated roller, or by high frequency heating, so as to melt the films together, or it has been further contemplated to feed metallic pigment between the films and heat this by means of induction heating, and further to apply the fibers to one film, and immediately extrude the second film thereunto so that the second film would envelop the reinforcing fibers and bond them to the base.

These methods have the disadvantages respectively that the application of adhesive calls for a multiple step operation and for adhesive compounding and handling, usually also entailing solvent recovery. The processes based on heat sealing the films together so as to envelop the reinforcement are disadvantageous because application of the heat will certainly break down any reinforcing or strengthening effect of orientation in the film layers and maybe even in the fibers. The method of applying metal pigment to the center and heat sealing this selectively by induction heating of metallic pigment has the disadvantage that the said metallic pigments add to cost, and do not contribute to the strength of this fabric; furthermore, that being particulate, they will tend to cause local overheating at the points contacted by the pigments whether these be large or even very small, and further that induction heating is an expensive form of heat.

OBJECTIVES

An object of the present invention is to effect lamination by highly superficial heat applications, so that even when films one mil thick and thinner are employed, only less than 15 percent of the film's thickness will be actually brought to an adhesive state and at least 70 percent of the film's thickness will not be weakened.

Another object is a superior fibrous laminate made at low cost.

Another object is a machine for producing reinforced laminate at lower cost and equal or better quality, than has previously been attained.

A further object is improvements in the art of making flexible, foldable laminates.

Further objects will become apparent as the following detailed description proceeds.

DRAWINGS

In discussing this invention, we make reference to the drawings, of which FIG. 1 is a schematic cross-sectional diagram of the apparatus employed, showing also the process. FIGS. 2, 3 and 4 show the products prepared by the use of this process. FIG. 5 is a detailed perspective view and FIG. 6 is a detail of the apparatus in section. FIG. 7 is a side sectional view of the laminate. The drawings are given only to illustrate the invention and are not intended as limitations.

DESCRIPTION OF THE INVENTION

In accordance with our invention, we feed non-woven thermoplastic filaments into the bite between laminating rollers, while closely regulating speed and temperature so that only the inner surface layers of the films are softened by the heat, while the major part of the film retains its previous orientation and strength. While passing thru the laminating zone, the softened inner surfaces of the films flow together and fuse, to form an intermediate non-oriented layer, in which the fibers are held, so as to provide a laminate consisting essentially of 3 layers: Two outer highly oriented films, and between these a single layer of a lower degree of orientation, if any, in which are held the reinforcing fibers, and which has been formed by a fusion of material originating from both of the first mentioned films.

Referring to FIG. 1, 1 and 2 are rollers supplying the thermoplastic oriented films 3 and 4 to the laminating means which in this case consists of the laminating rollers 5 and 6. These rollers may be heated or cooled electrically or by circulating fluids; these details have not been shown because they are not essential to the invention. Because of the necessity for extremely rapid and sensitive heat modulation, we prefer to use electrical means for heating. The heating means 9 are preferably electrically energized heaters, through they might also be gas controlled radiators or jets of heated gas such as air or nitrogen or steam.

The reinforcing fibers are supplied from a creel 14 to an angularizer 13, which arranges the fibers in preselected patterns of non-woven essentially parallel groups of fibers 12. These are then fed into the laminating means between the films 3 and 4.

While the films and fibers travel into the laminating means at a speed of at least 20 ft/min and preferably over 200 ft/min, and may be brought to speeds even an order of magnitude higher, their inner surfaces are very rapidly and exactly heated by heating means 9 so as to bring about a softening of the innermost layers to the point that orientation is substantially nil, and the layers flowable so that on contact they will hold the fibers and fuse into a single essentially amorphous layer. This may, if desired, be re-oriented by subsequent drawing, if drawing of the originally supplied fibers is incomplete, but it does preserve an identity distinct from that of the outer film layers.

The necessary delicate control of the heat source may be supplied as follows: A radiation type photoflux meter is pointed at the films just as they enter the bite. This instrument (such as "Thermodot," built by Ircon, Inc., Skokie, Ill.) can sense the temperature by radiation without touching the actual surface it is measuring, and has the sensitivity and electronic speed (from millisecond to microsecond range, the latter with an indium antimonide sensor in the instrument) which makes it possible for it to govern the heating means with such precision and speed, that the outermost surface of the films can be fused in a constant manner, say to as little as 0.01 percent thereof or as much as 40 percent thereof in films having a thickness from ½ mil to 12 mil, or in laminates having an aggregate thickness between 1 mil and 10 mil; or so that the depth of heat penetration sufficient to cause plastic flow instantaneously can be regulated with about 10 percent accuracy at any level of penetration between 20 percent of the total thickness and 0.01 mil.

To effect this close control in a fast moving web, the output from the photon flux temperature sensor 10 is processed by a computer 11, which in turn sends anticipating instructions to the heating means which may be single or multiple, and advantageously also to the speed regulating means for the driving mechanisms.

From the laminating means 5 and 6 the laminate produced may move to a crosslinker 15, which may be an electron beam generator or a substance emitting ionizing radiation, such as Cobalt 60, or an ultra-violet radiator, or even a chamber in which the laminate passes through a gaseous crosslinking medium such as for example formaldehyde for an amino- or hydroxy resin film, or hydrazine for a carboxyl resin like acrylic acid, or a diamine for a polyvinyl chloride film, and the like.

This crosslinking treatment is not usual, but can be applied when high dimensional stability is required.

The laminate 7 thus produced is taken up on roll 8.

FIG. 2 shows a top view of a longitudinal film laminate with a single fiber layer 16 thus produced, FIG. 3 of a diamond pattern with non-woven fibers 17 and 18 where the difference from the prior art of U.S. Pat. No. 2,851,389 is that the slidability of fibers which is essential to maximal tear strength has been attained for the first time at high production speeds without the use of any adhesive.

Figure 7:
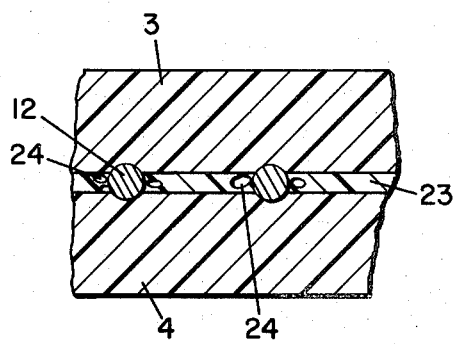

FIG. 7 shows how the fibers may be held in the fused layer without necessarily being wholly surrounded by it. This occurs particularly when the heating conditions are selected to produce minimal fused layers, yet sufficient to attach the fibers to both films. In this case, the aggregate fused disoriented layer 23 is thinner than the diameter of the fibers, so that the laminate bulges slightly at the path of the fibers, and small parting lines or air bubbles 24 may be present on the sides of the fibers. This is desirable when easy sliding motion of the fibers is helpful to adapt to stress directions to which the laminate may be exposed.

EXAMPLE

Figure 1:
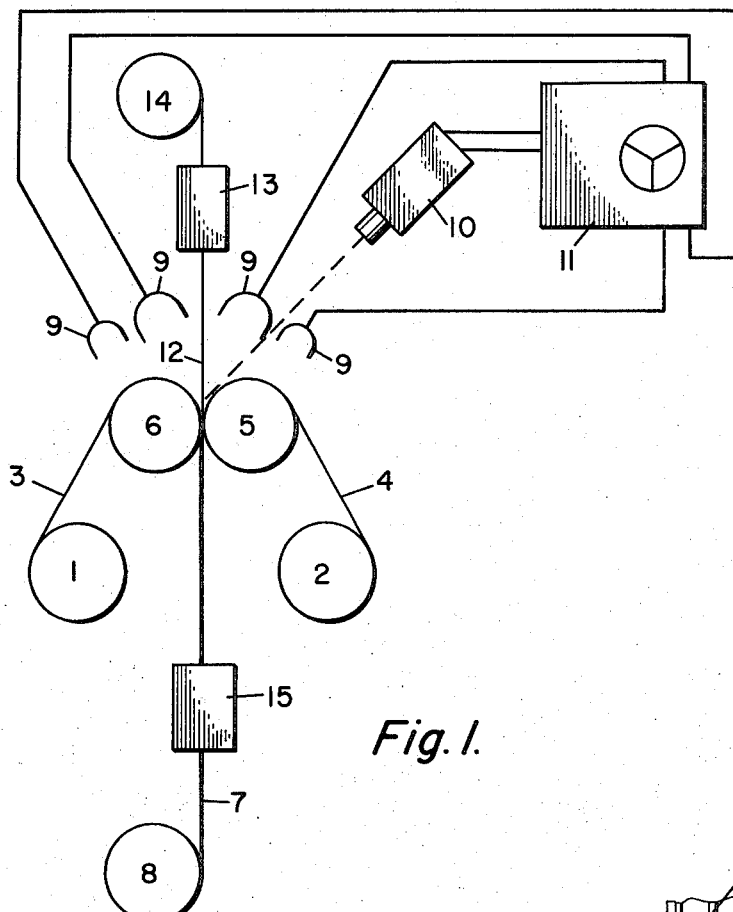
Figure 2:
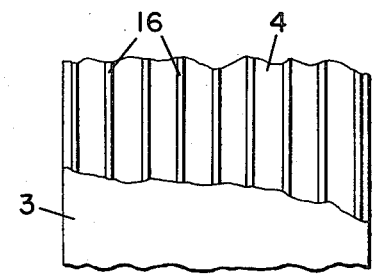
Figure 4:
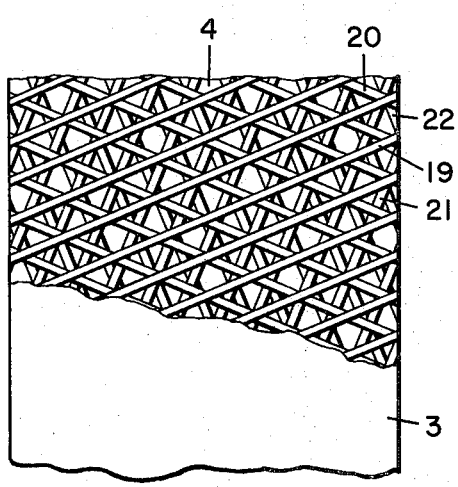
FIG. 4 shows a laminate.
Figure 3:
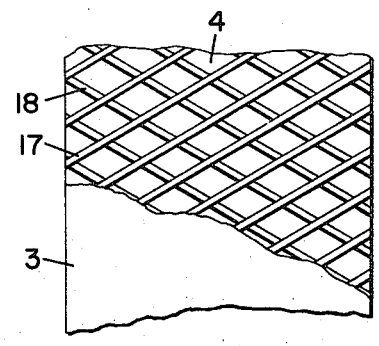
Figure 5:
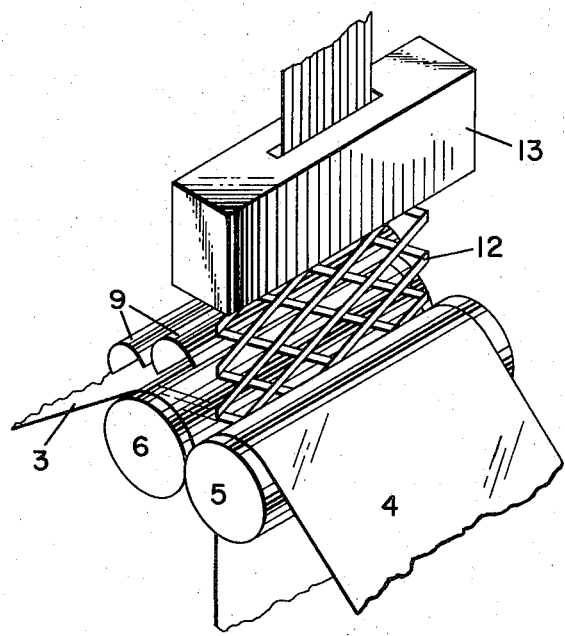
FIG. 5 is a detail view showing how the angulated fibers enter the laminating means and FIG. 6 shows in detail how the lamination occurs, with the fusion of the heated layers on the insides of the films.
Figure 6:
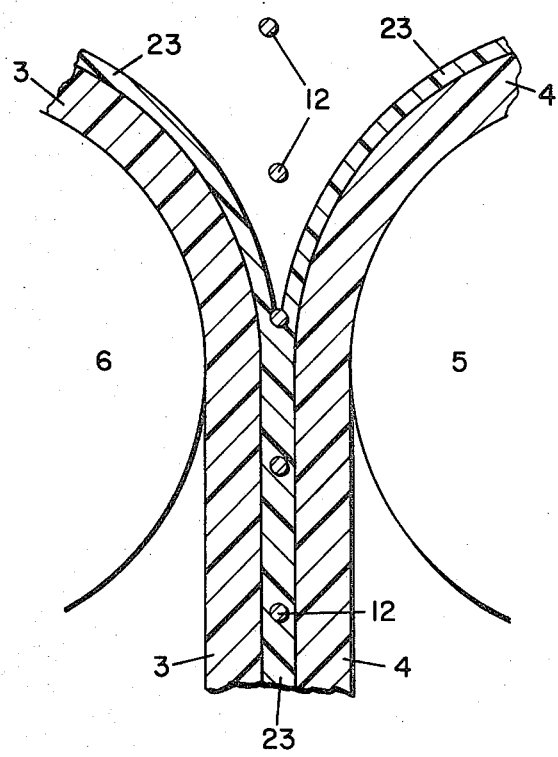

Using the procedure and apparatus described above in conjunction with FIG. 1, laminates were prepared of 1 ½ to 10 mil films of the plastics stated below. The film was supplied at a speed of 20 ft/min. Infrared lamps were used as the heat source together with polished parabolic reflectors placed at a distance of 1 ½ to 3 inches from the laminating rollers. Initial runs were made with manual control, for higher speed operation the lamp heat output was governed by modulating the signal output from a "Thermodot" photon flux radiometer.

Immediately following the lamination, we cooled the film by air jets to below 200°F immediately after leaving the pressure rollers. After traveling a couple feet, the surface temperature was below 100°F.

The take-off roller was provided with a clutch for constant pull tension take-off, to be controlled by the operator who tightened the tension when any tendency to wrinkling appeared, but otherwise kept it as loose as possible in order to avoid stretching of the film. This became touchy with films of 1 ½ and 2 mils.

The line power used was 220 V, and was varied by power stat, gradually increasing it from 50 Volts to about 180 to 200 Volts. The rotational speed of the laminating rollers was controlled by a hand crank transmission, starting at 0 and gradually increasing the speed to the 20 ft/min which was operational speed for the pilot machine used in this initial run. For full speed operation, it is envisaged to go to 400 to 500 ft/min with increase in heat radiation applied, so that the radiometer surface temperature just as the film enters the bite between the laminating rollers will be low enough to permit the instant heat weld described, generally above the softening temperature of the plastic used in the film.

The total effective heating width was 2 inches. It is not believed that this will require major modification for speed increases, inasmuch as the thickness of the softened surface layer is less important to bonding than is the temperature, and the temperature can be brought to the desired level by increasing the intensity of the heating to match the increased speed.

At the beginning of the run, the laminating rollers were preheated by an internal heating coil (steam would have done as well) to 150°F. This required about 2 minutes — within this time the operational conditions should be reached by the other parameters:

Voltage of power supply from 50 to 200 V

Temperatures at the laminating rollers from 100° to 400°F within a couple feet and following the laminating roll 150° to 160°F Linear speed from 0 to 20 ft/min In several runs of an hour's duration, the above conditions could be maintained easily and no further adjustment was needed once the parameters had reached desired equilibria. Runs were made with polyethylene, polypropylene (both high density and low density of these), polyvinyl chloride (plasticized, extruded), polyethyleneglycol terephthalate, fusible polyurethane film, and nylon film. All of these were found suitable after minor operational variations well within the skill of the operator.

As reinforcing material we used 420 Denier nylon fiber, both preshrunk and regular, polyethylene gylcol terephthalate, polypropylene slit ribbons, glass fibers, and polyvinyl chloride coated glass fibers.

While all of these gave useful results, we preferred for adhesion and uniformity the laminates made using polyvinyl chloride with any of the fibers, and high density polyethylene, or any of the polyolefins when loaded with 3 to 8 percent carbon black, preferably with acrylate or polyolefin fibers.

Weathering tests with the film laminates thus produced showed no deterioration compared with conventional adhesive laminates.

ALTERNATIVES

To determine the time required to effect the desired limited heating of a portion of the film, without affecting the strength of the bulk of the film, we calculated the time required for raising the original temperature of 70°F to 160°F by means of an air blast at 500°, 600° and 700°F, in a 2 mil polyethylene film, to a depth of 10 percent of the thickness.

Using the conductivity heat flow equation $$H = KA(\Delta T)(\text{Time})/d$$

where
- $K$ = Conductivity heat transfer coefficient
- $s$ = seconds of time
- $H$ = Heat required
- $C_p$ = Specific Heat
- $\Delta T$ = Temp. difference between air blast temp. and 0.2 mil depth temp. original temp. of 70°F
- $d$ = depth in film
- $A$ = Area
- $D$ = Density
- $\Delta °C = (5/9)\Delta °F$ and assuming the following approximations:
Specific heat — $C_p = 1$ cal./gm./°C
Density — $D = 1$ gm./cc.
Heat conductivity — $K = 3 \cdot 10^{-4}$ cal./°C/sq.cm./cm./second
Time $= [(C_p)D/4K]d^2 = [(1)(1)/4(3 \cdot 10^{-4})]K^2 = d^2/1 \cdot 2 \cdot 10^{-3}$ in seconds for $d$ in cms.

we arrived at the following theoretical values:

| Air blast temperature | Time required for heating 10% depth of 2 mil film to 160° |
|---|---|
| 500°F | 0.35 milliseconds |
| 600°F | 0.31 milliseconds |
| 700°F | 0.29 milliseconds |

Based on this, air heating under the conditions postulated would permit production at the rate of at least 590 ft/second assuming a 2 inch heating zone in contact with air at 700°F.

Thus, the rate of surface heating, whether by air or steam or electricity, will not be a limiting factor in the speed of production, but at high speeds the ease of control will be important. For this reason, electrical radiation heating is preferred.

To arrest the infrared radiation in the surface layer and cause heating in this layer preferentially, we may add to the film an infrared absorbent substance, such as for example 0.05 to 5 percent of a compatible iron compound, such as ferric naphthenate of ferric octoate, or the ferric salt of a vinyl carbonic acid, such as acrylic acid.

The present invention is not directed to the materials used to produce the laminates; any thermoplastic or heat fusible film of good mechanical properties can be used. For the guidance of those desiring to use the invention, the following materials are listed as suitable, but any other fusible and mechanically satisfactory polymer film can be used: polyolefins, such as polypropylene and polyethylene, polyvinyl polyvinly halides such as polyvinyl chloride and fluoride; cellulose acetate, fluorocarbon films such as polytetrafluoro ethylene, polyester films such as diethylene glycol terephthalate, polyphenoxide films, polyimid films such as polybenzimidazol, and the like. It is generally preferred to use fibers spun from the same or similar polymers, keeping in view that it is easiest to preserve the fiber strength undamaged if fibers are used which do not become disoriented at the temperatures of fusion of the films with which they are used. We prefer to use fibers which do not become disoriented below the disorientation temperatures of the films; however if the fibers are more than twice as thick as the disorientation zone of the films under the operating conditions used, it is possible to use almost any pair of plastic and fiber that would occur to those skilled in the art.

Having thus disclosed our invention, we claim:

1. A flexible, foldable, adhesive-free plastic laminate which comprises two layers of molecularly oriented plastic, a layer of molecularly disoriented plastic separating these oriented layers, said disoriented layer having a thickness between 0.0012 mils and 4.8 mils which thickness is also not more than 40 percent nor less than 0.01 percent of the thickness of the laminate, and substantially molecularly oriented organic polymer fibers imbedded in said disoriented layer.

2. The plastic laminate of claim 1, in which the said oriented layers have an aggregate thickness between 1 mil and 10 mil, and the disoriented layer common to them has a thickness between 0.01 mil and 40 percent of the total thickness of the laminate.

3. The plastic laminate of claim 1, in which the said organic polymer fibers have a thickness exceeding that of the disoriented layer, and the said disoriented layer is bonded to two sides of the said fiber, leaving the intermediate zones thereof substantially unbounded.

4. The plastic laminate of claim 1, in which the first mentioned plastic layers are crosslinked in addition to being oriented.

5. The laminate of claim 1, in which the said organic polymer fibers are held firmly, yet with a strength less than the tear strength of said laminate, so that on application of tear stresses the said fibers will slide and bunch forming bundles which prevent the propagation of tear.

6. The laminate of claim 5, in which the said disoriented layer has been crosslinked so as to make the said laminate substantially dimensionally stable.

7. The laminate of claim 5, in which the said substantially oriented organic fibers form a diamond pattern.

8. The laminate of claim 5, in which the adhesion of the said fibers within the laminate is weakened by air bubbles along the sides of said fibers, thereby rendering these slidable within the said laminate in response to directional stresses.

9. The laminate of claim 5, in which said laminate contains an added infrared absorbing substance.

10. The laminate of claim 5, in which the laminate contains between 0.05 percent and 5 percent of its weight of a compatible ferric compound.

11. The laminate of claim 5, in which the plastic is a polyolefin.

* * * * *